Nov. 4, 1924.

L. M. BISEL ET AL 1,513,736

DIRIGIBLE HEADLIGHT FOR AUTOMOBILES

Filed Sept. 13, 1922   2 Sheets-Sheet 1

Inventor
LLOYD M. BISEL.
WILLIAM I. BISEL.

By

*Attorney*

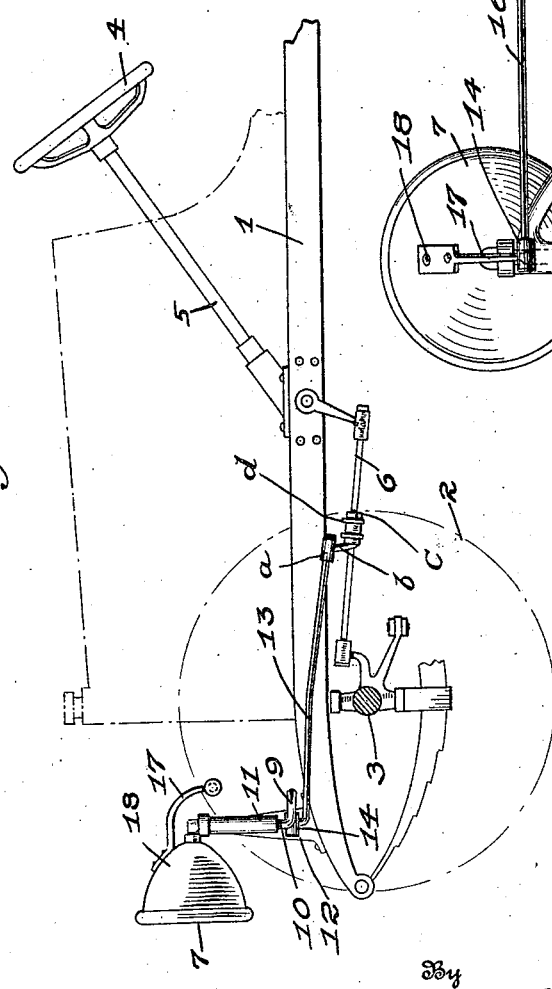

Patented Nov. 4, 1924.

1,513,736

UNITED STATES PATENT OFFICE.

LLOYD M. BISEL AND WILLIAM I. BISEL, OF WILLIAMSPORT, PENNSYLVANIA.

DIRIGIBLE HEADLIGHT FOR AUTOMOBILES.

Application filed September 13, 1922. Serial No. 587,985.

*To all whom it may concern:*

Be it known that LLOYD M. BISEL and WILLIAM I. BISEL, citizens of the United States, residing at Williamsport, in the county of Lycoming and State of Pennsylvania, have invented certain new and useful Improvements in Dirigible Headlights for Automobiles, of which the following is a specification.

This invention relates to new and useful improvements in dirigible headlights for automobiles and more especially to pivotally mounted headlights which will turn sidewise in unison with the steering wheel of the vehicle.

One object of our invention is to provide a device of this character which is simple and economical in construction and highly efficient in operation.

A further object of our invention is to provide a dirigible headlight which may be easily installed or applied to nearly all makes of automobiles without difficulty by any mechanic and does not involve the use of gears, springs or other parts easily affected by dust and wear and liable to become broken or deranged.

With the foregoing and other objects in view that will appear as the nature of our invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 2 is a vertical longitudinal section taken on line 2—2 of Figure 1, looking in the direction indicated by the arrow.

Figure 3 is a vertical transverse section, taken on line 3—3 of Figure 1, looking in the direction indicated by the arrow.

Figure 4 is a horizontal section taken on line 4—4 of Figure 3, and

Figure 5 is a vertical transverse section taken on line 5—5 of Figure 3.

Figure 1:
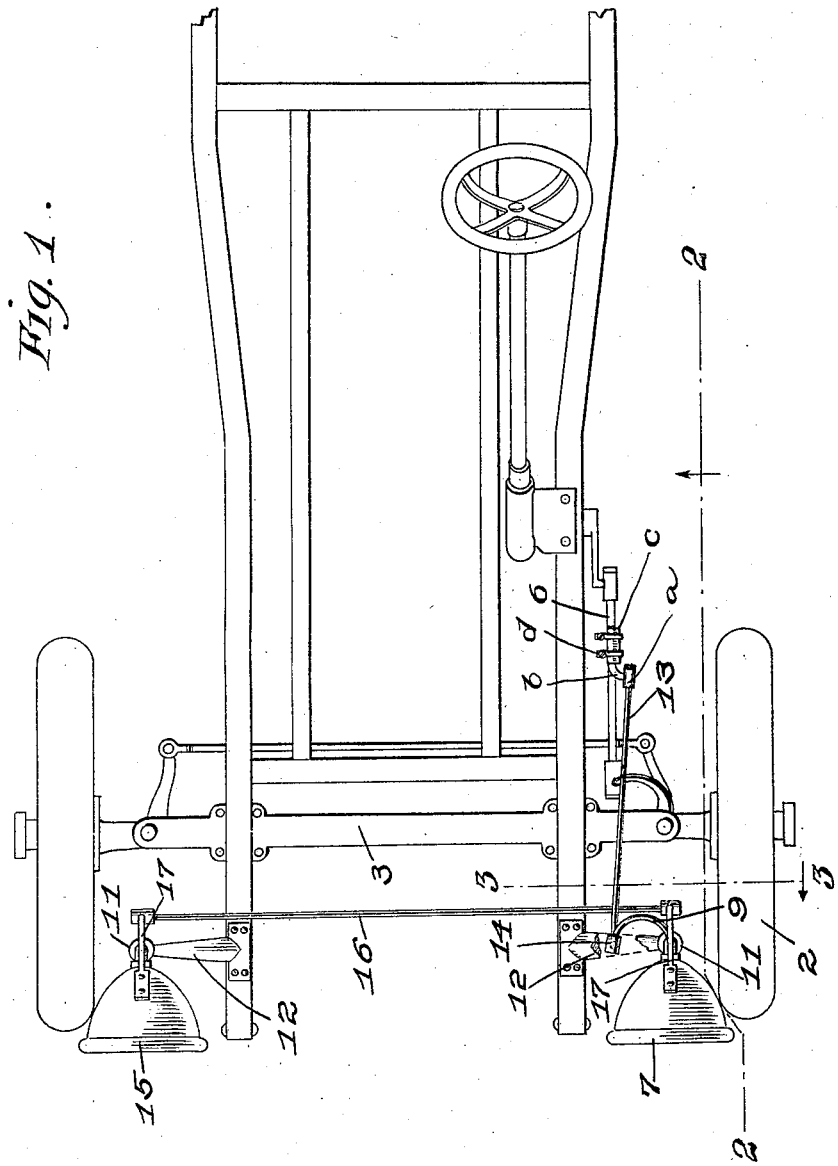
Figure 1 is a plan view, illustrating the application of our invention.

Referring to the drawings for a more particular description of our invention and in which drawings like parts are designated by like reference characters throughout the several views, 1 indicates the chassis, 2 the front wheels, 3 the front axle, 4 the steering wheel, 5 the steering post, 6 the steering rod and 7 the headlights of an automobile. These parts are of any ordinary or standard construction and hence, no further explanation in this regard will be necessary.

Our headlight steering mechanism comprises the steering member 8 consisting of the lower horizontal longitudinally curved approximately U-shaped member or portion 9 and the upright or vertical member 10, which extends through and is journaled in the post or bearing box 11 of the corresponding lamp supporting bracket 12. The upper end of the vertical member 11 is connected with the corresponding headlight in such a manner that as said member is turned in its bearings, the headlight is correspondingly turned sidewise to the right or left.

The outer or free end of the horizontal portion 9 of the steering member is connected with the steering rod 6 by the longitudinally disposed connecting rod 13. The front end of the connecting rod 13 is connected with said horizontal portion 9 of the steering member by the ball and socket joint 14 or other equivalent means, while the rear end of said rod is connected by the ball and socket joint *a* with the upper end of the vertical arm or link *b*, whose lower substantially horizontal portion *c* is clamped, as at *d*, to the main steering rod 6.

Headlight 7 is connected with the headlight 15 at the opposite or right hand side of the machine by the cross rod 16 and depending brackets 17 attached at their upper ends, as at 18, to said headlight.

In practice, the headlights will turn sidewise in unison with the steering wheel of the automobile, as will be apparent.

From the foregoing description taken in connection with the drawings, it is thought that the construction, operation and advantages of our invention will be readily understood without requiring a more extended explanation.

Having described our invention, what we claim as new and desire to secure by Letters Patent, is:—

Means for turning headlights of an automobile machine comprising brackets mounted upon the frame of the machine and having vertically disposed bearing sleeves projecting outwardly and laterally therefrom, shafts journaled in the sleeves, lamp casings carried at the upper ends of the shafts, arms attached to the top portions of the lamp casings and having their intermediate portions disposed transversely over the upper ends of the shafts, a cross rod operatively connected with the rear ends of the arms, the lower end of one of the shafts having integrally therewith a U-shaped member with its free end portion disposed inwardly under its bracket, a connecting rod between the free end of the U-shaped member and the steering rod of the machine and universal points between the ends of the connecting rod and the U-shaped member and the steering rod, respectively.

In testimony whereof we affix our signatures.

LLOYD M. BISEL.
WILLIAM I. BISEL.